Patented Nov. 10, 1964

3,156,613
METHOD OF REPELLING BIRDS WITH SUBSTITUTED PYRIMIDINE COMPOUNDS
Lyle D. Goodhue and Kenneth E. Cantrel, Bartlesville, Okla., assignors to Phillips Petroleum Company, a corporation of Delaware
No Drawing. Filed Aug. 24, 1959, Ser. No. 835,407
16 Claims. (Cl. 167—46)

This invention relates to a method for repelling birds. In one aspect, the invention relates to a method for rendering surfaces repellent to birds. In another aspect, it relates to a method for treating seed, grains, and the like, so as to render the same repellent to birds that normally feed thereon. In a further aspect, it relates to a novel bird repellent.

A number of repellents for certain pests, such as insects and rodents, have been developed and are known in the art. However, very little success has been attained in the search for a material which is repellent to birds. As is well known, many birds are pests in that they, through their roosting habits, foul buildings, sidewalks, statues, and the like. It is desirable for many applications to repel birds from such areas and surfaces. Also, the loss of seeds, grains, and the like, at the present time because of consumption by birds represents a large financial loss in this country each year. Thus, there is a need for a method of treating such seeds, grains, and the like, in such a manner as to cause birds, which normally feed thereon, to have an aversion toward such food.

Accordingly, it is an object of this invention to provide a method for repelling birds. Another object is to provide a novel bird repellent. Another object is to provide a method for rendering surfaces repellent to birds. Another object is to treat seeds, grains, and the like, in such a manner as to cause birds, which normally feed thereon, to have an aversion toward such food. Other objects and advantages of this invention will become apparent from the following discussion and appended claims.

We have now discovered that birds are repelled by substituted pyrimidine compounds of the formula:

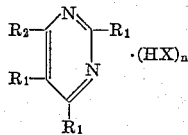

where $R_1$ is selected from the group consisting of hydrogen and an alkyl having from 1 to 5 carbon atoms; $R_2$ is selected from the group consisting of amino, phthalimido, and monoalkylamino and dialkylamino having from 1 to 5 carbon atoms in each of the alkyl groups; X is selected from the group consisting of chloro, bromo, acetoxy and propionoxy; $n$ is an integer from 0 to 3; and wherein the total number of carbon atoms in the $R_1$'s and $R_2$ is at least 5.

Representative and specific substituted pyrimidine compounds of the above general formula which can be employed as bird repellents according to the practice of this invention are: 2-n-pentyl-6-aminopyrimidine; 2-tert-pentyl-6-aminopyrimidine; 2-isopropyl-4-ethyl-6-aminopyrimidine; 2,4-diethyl-5-methyl-6-aminopyrimidine; 6-(n-pentylamino)pyrimidine; 2-n-butyl-6-(methylamino)pyrimidine; 2,4-diethyl-6-(methylamino)pyrimidine; 2,4-di-n-propyl-6-(methylamino)pyrimidine; 4,5-di-isopropyl-6-(methylamino)pyrimidine; 2,4-di-n-butyl-6-(n-butylamino)pyrimidine; 6-(di-n-pentylamino)pyrimidine; 2,4,5-trimethyl-6-(dimethylamino)pyrimidine; 2-ethyl-4-methyl-6-(dimethylamino)pyrimidine; 2,4,5-trimethyl-6-(diethylamino)pyrimidine; 2,4,5-tri-n-pentyl-6-(di-n-pentylamino)pyrimidine; 2-methyl-4-n-butyl-6-(methylethylamino)pyrimidine; 2-n-propyl-6-(ethyl-n-propylamino)pyrimidine; 2-methyl-3-ethyl-4-n-propyl-6-(ethyl-n-propylamino)pyrimidine; 2,4,5-tri-n-pentyl-6-(n-butyl-n-pentylamino)pyrimidine; 6-phthalimidopyrimidine; 2,4-dimethyl-6-phthalimidopyrimidine; 2,4-diethyl-6-phthalimidopyrimidine; 2,5-diethyl-6-phthalimidine; 2,4-diethyl-5-methyl-6-phthalimidopyrimidine; 2,4,5-tri-n-pentyl-6-phthalimidopyrimidine; and the like; and the mono-, di-, and trihydrochlorides, the mono-, di-, and trihydrobromides, the mono-, di-, and triacetates, and the mono-, di-, and tripropionates thereof.

The bird repellents of this invention can be applied for their intended purpose as the pure compound, or in combination with a carrier or inert materials as in solution or emulsion. Solvents or carriers should be used which are substantially inert with respect to the active repellent. Some examples of carrier materials which can be employed are acetone, deodorized kerosene, naphthas, isoparaffinic hydrocarbon fractions boiling in the approximate range of 260 to 800° F. (Soltrol), and the like. If desired, the bird repellents of this invention can be applied as aqueous emulsions, in which case a suitable emulsifying or wetting agent is employed. The repellent materials can also be applied as a dust, using such solid carriers as kieselguhr, and the like. In addition, the materials for repelling birds can be applied to surfaces from which it is desired to repel these animals in conjunction with an adhesive.

The bird repellents of this invention can be applied in the above-described forms by spraying, brushing, dusting, etc. The usually preferred method of application is by spraying a liquid composition on the surface to be treated. When applying the repellents of this invention in a solvent or carrier, the liquid compositions normally contain from 0.1 to 10 weight percent of one of the described pyrimidines, although concentrations above and below this range can be used. When these materials are applied in the form of dust, the concentration of the active ingredient is preferably within the range between 1 and 20 weight percent, although concentrations above and below this range are applicable.

The bird repellents of this invention are usually applied to a surface in a manner so as to deposit an amount within the range between 1 and 100 grams of the active repellent material per each 100 square feet of surface from which birds are to be repelled. Larger or smaller amounts can be applied, if desired, although larger amounts are generally uneconomical.

When the repellents of this invention are applied to seeds, grains, and the like, application is made so as to deposit between 0.05 and 5 weight percent, based on the seeds or grains, of the active repellent. A more preferred range for this application is from 0.1 to 2 weight percent. Feed normally consumed by birds and treated according to this invention to cause birds to have an aversion thereto include rice, wheat, barley, kale, oats, corn, rye, sorghum, kaffir corn, fruit, and planted seeds of flowers, vegetables, and the like.

The repellent compounds of this invention can be prepared by any suitable method. A general method which can be employed for their preparation is a condensation of an amino, alkylamino, or phthalimido compound with a dicarboxylic acid diester. This results in the formation of a heterocyclic ring compound containing keto groups. The keto groups are then converted to chloride by reaction with $POCl_3$. These halogenated pyrimidines can then be converted to the corresponding substituted pyrimidines by reaction with suitable compounds, for example, alcoholic ammonia.

The free pyrimidines or their acetates, propionates, hydrochlorides or hydrobromides, including the mono-, di- and triacid salts, are equally effective. The acid salts of these compounds can be prepared by treating the selected pyrimidine with the proper stoichiometric amount of the particular acid depending upon whether the mono-, di- or triacid salt is desired.

The bird repellents of this invention can be applied to many different types of surfaces which it is desired to render repellent to birds. For example, these materials can be applied to grain, fruit trees, seeds, tree seedlings, window ledges, roof beams, and buildings in general, and the like.

The following examples further illustrate the objects and advantages of the subject invention, but in these examples the specific compounds, amounts of ingredients, and other conditions, which are set forth for illustrative purposes, should not be construed so as to unduly limit the subject invention.

EXAMPLE I

A series of runs were made in which several substituted pyrimidines were tested as repellents for baby chickens. In these runs, a solution of 0.5 gram of the pyrimidine in 20 cc. of acetone was applied to 50 grams of prepared chicken feed. The chicken feed was thoroughly mixed with the solution, after which the acetone was evaporated under a hood, using frequent stirring. The dried treated feed was then placed in 2-ounce wide mouth jars which were each placed in the center of a 6-inch round plastic petri dish to catch feed scratched out by the baby chickens. The feed was then placed in a cage containing two hungry baby chickens, which were 2 to 4 days old. The amount of feed in grams which was eaten on the first and second days was estimated, and on the third and final day the amount consumed was determined by weighing except where all the feed had been eaten. Pertinent data and results from these runs are tabulated in Table I.

Table I

| Run | Compound | Amount of feed consumed (g.) | | |
|---|---|---|---|---|
| | | 1st Day | 2nd Day | 3rd Day |
| 1 | None (control) | 50 | | |
| 2 | 2,4-dimethyl-5-methyl-6-aminopyrimidine | 10 | 10 | 13 |
| 3 | 2,4-dimethyl-6-phthalimidopyrimidine | 10 | 15 | 28 |
| 4 | 2,4-dimethyl-6-aminopyrimidine | | 50 | |
| 5 | 2,4-dimethyl-6-aminopyrimidine·HCl | | 50 | |

In Table I, Runs 2 and 3 represent runs wherein the chicken feed was treated with a substituted pyrimidine of the subject invention, whereas in Runs 4 and 5 the pyrimidine compounds employed were those which fall outside the scope of the subject invention. From Table I it can be seen that the substituted pyrimidine repelling compounds of this invention were quite effective, whereas those falling outside the scope of this invention are ineffective.

EXAMPLE II

Another series of runs were carried out in which various pyrimidines were tested as repellents for Coturnix quail. In these runs, 100 grams of grain feed in each run was treated with a solution of the pyrimidine to be tested, the solvent was evaporated, and each test quantity of the feed was placed in a cage with four hungry Coturnix quail. The amount of feed in grams consumed on the first and second days was estimated, and the amount consumed by the third day was actually determined by weighing. In one of these runs, Run 3, the pyrimidine compound was prepared by dissolving one gram thereof in 40 ml. of a 50/50 water/ethyl alcohol mixture, adding several drops of acetic acid to the mixture, and then warming, the resulting solution being a solution of the monoacetate of the pyrimidine. All of the other runs were made by dissolving one gram of the pyrimidine in 40 ml. acetone. In all runs, sufficient solution was applied to the grain to place the desired amount of pyrimidine on the grain (i.e., 1 wt. percent). Pertinent data and results of these runs are tabulated in Table II.

Table II

| Run | Compound | Amount of feed consumed (g.) | | |
|---|---|---|---|---|
| | | 1st Day | 2nd Day | 3rd Day |
| 1 | None (control) | 100 | | |
| 2 | 2,4-diethyl-5-methyl-6-aminopyrimidine | 15 | 18 | 40 |
| 3 | 2,4-diethyl-5-methyl-6-aminopyrimidine·CH$_3$COOH | 0 | 5 | 57 |
| 4 | 2-methyl-4-chloro-6-aminopyrimidine | 10 | 65 | 72 |
| 5 | 2-cyanamino-4-hydroxy-6-aminopyrimidine | 15 | 100 | |
| 6 | 2-amino-4-methyl-6-hydroxypyrimidine | 60 | 100 | |

EXAMPLE III

In this example, grain containing 0.12 weight percent of 2,4-diethyl-5-methyl-6-aminopyrimidine was placed in pans and spotted in a field frequented by numerous varieties of birds. Pans of untreated grain, serving as control were interspersed between the pans containing the treated grain. It was found that the average amount of the treated grain which was eaten by the birds was 63 percent, an excellent value for repellency at this extremely low level of repellent. Similar tests at one weight percent also provided excellent repellency.

EXAMPLE IV

In this sample, 2,4-diethyl-5-methyl-6-aminopyrimidine was dissolved in a 50/50 mixture of alcohol and water to which was added several drops of acetic acid, causing the formation of the acetate of this pyrimidine. This solution, containing 100 grams of the pyrimidine acetate per 100 ml., was painted on roof beams which were frequented by sparrows. It was found that 100 percent repellency lasted for 10 days, and even after 49 days the repellency was still good. Areas of these roof beams which were not treated with the pyrimidine acetate solution were continually used as roosting places by the sparrows.

EXAMPLE V

In this example, a series of runs was carried out in which pans of treated and untreated grain were exposed to birds on the roof of a building in a municipal area heavily frequented by sparrows, pigeons and other varieties of birds. In each of these runs, 340 grams of sorghum grain were treated with a solution of 3.4 grams of 2,4-diethyl-5-methyl-6-aminopyrimidine dissolved in 30 cc. of acetone. The solvent was then evaporated off, and the treated grain was placed in a pan in the above-described location. A pan containing the same amount of untreated grain was placed in the same location. Daily observations were made of the amount of treated and untreated grain which had been consumed by the birds. Since the untreated grain was eaten very rapidly, it was necessary to replenish the untreated grain a number of times. The effectiveness of the repellent was calculated by the formula:

$$\text{Percent repellancy} = \frac{\text{amt. of treated grain consumed during 14-day period}}{\text{amt. of untreated grain consumed during 14-day period}} \times 100$$

By the method of this example, 2,4-diethyl-5-methyl-6-aminopyrimidine was found to be 86 percent repellent.

Various modifications and alterations of this invention will become apparent to those skilled in the art without departing from the scope and spirit of this invention. And it is to be understood that the foregoing description

We claim:
1. A method of repelling birds which comprises subjecting the locus from which birds are to be repelled to the action of 2,4-diethyl-5-methyl-6-aminopyrimidine.
2. A method of repelling birds which comprises subjecting the locus from which birds are to be repelled to the action of 2-4-diethyl-5-methyl-6-aminopyrimidine acetate.
3. A method of repelling birds from a building which comprises applying to the surface of said building 2,4-diethyl-5-methyl-6-aminopyrimidine.
4. A method of repelling birds from a building which comprises applying to the surface of said building a composition comprising a carrier adjuvant and from 0.1 to 20 weight percent of said composition of 2,4-diethyl-5-methyl-6-aminopyrimidine.
5. A method in accordance with claim 4 wherein said composition is applied to said surface so as to deposit an amount within the range between 1 and 10 grams of the 2,4-diethyl-5-methyl-6-aminopyrimidine per each 100 square feet of said surface.
6. A method of repelling birds from a building which comprises applying to the surface of said building 2,4-diethyl-5-methyl-6-aminopyrimidine acetate.
7. A method of repelling birds from a building which comprises applying to the surface of said building a composition comprising a carrier adjuvant and from 0.1 to 20 weight percent of said composition of 2,4-diethyl-5-methyl-6-aminopyrimidine acetate.
8. A method in accordance with claim 7 wherein said composition is applied to said surface so as to deposit an amount within the range between 1 and 10 grams of the 2,4-diethyl-5-methyl-6-aminopyrimidine acetate per each 100 square feet of said surface.
9. A method of discouraging birds from eating seeds which comprises treating said seeds with 2,4-diethyl-5-methyl-6-aminopyrimidine.
10. A method of discouraging birds from eating seeds which comprises treating said seeds with 2,4-diethyl-5-methyl-6-aminopyrimidine acetate.
11. A seed treated to discourage eating thereof by birds, said seed having been treated with 2,4-diethyl-5-methyl-6-aminopyrimidine.
12. A seed treated to discourage eating thereof by birds, said seed having been treated with 2,4-diethyl-5-methyl-6-aminopyrimidine acetate.
13. A method of discouraging birds from seating a material which otherwise a bird would eat which comprises treating said material with 2,4-diethyl-5-methyl-6-aminopyrimidine.
14. A material treated to discourage eating thereof and which a bird would otherwise eat, said material having been treated with 2,4-diethyl-5-methyl-6-aminopyrimidine.
15. A method of discouraging birds from eating a material which otherwise a bird would eat which comprises treating said material with 2,4-diethyl-5-methyl-6-aminopyrimidine acetate.
16. A material treated to discourage eating thereof and which a bird would otherwise eat, said material having been treated with 2,4-diethyl-5-methyl-6-aminopyrimidine acetate.

References Cited in the file of this patent

UNITED STATES PATENTS

| | | |
|---|---|---|
| 2,540,826 | Larchar | Feb. 6, 1951 |
| 2,688,619 | Mahan et al. | Sept. 7, 1954 |
| 2,735,225 | Goodhue et al. | Feb. 21, 1956 |
| 2,740,785 | Rorig et al. | Apr. 3, 1956 |
| 2,749,344 | Hutchins et al. | June 5, 1956 |
| 2,811,478 | Manzelli et al. | Oct. 29, 1957 |
| 2,862,849 | Pray et al. | Dec. 2, 1958 |

FOREIGN PATENTS

| | | |
|---|---|---|
| 819,692 | Germany | Nov. 2, 1951 |

OTHER REFERENCES

King: Chem. Eval. Insecticides and Repellents, U.S. Dept. Agri,. Handbook No. 69, pp. 1–15 and 299, May 1954.

Chemical Abstracts, vol. 50, page 13035F (1956).

Arch. Biochem. and Biophys., vol. 66, 1957, pp. 183–9.

Chem. Abs. ACS, vol. 37, 1943, p. 3435; vol. 37, 1944, p. 5838; vol. 50, 1956, pp. 10730–10731.

Bellack: Relationship Between Chem. Structure and Rat Repellency, Nat. Res. Council, pp. 48, 49, 108.